Oct. 15, 1929.  W. PETERSEN  1,731,906

ALTERNATING CURRENT ELECTRIC SYSTEM

Filed March 7, 1927

Inventor:
Waldemar Petersen,
by Alexander S. Lund
His Attorney.

Patented Oct. 15, 1929

1,731,906

UNITED STATES PATENT OFFICE

WALDEMAR PETERSEN, OF DARMSTADT, GERMANY, ASSIGNOR TO GENERAL ELECTRIC COMPANY, A CORPORATION OF NEW YORK

ALTERNATING-CURRENT ELECTRIC SYSTEM

Application filed March 7, 1927, Serial No. 173,298, and in Germany March 31, 1926.

My invention relates to alternating current electric systems and more particularly to improvements in the suppression of the earth leakage current of such systems.

There are known arrangements which are intended in high tension alternating current electric systems to suppress to a harmless amount the earth leakage or earth fault charging current which, on an accidental connection of a conductor to ground, flows in the earth connection. Such arrangements are disclosed in my United States Letters Patent 1,537,371 issued May 12, 1925, and assigned to the same assignee as this invention. That current which, notwithstanding the compensation employed, still flows in the earth leakage connection and which is customarily designated the residual earth leakage current, must not exceed a certain amount if the compensation is to be of practical value. In other words the magnitude of the residual earth leakage current must remain below the critical value at which an arc can permanently exist. The residual earth leakage current is composed of several parts originating from different causes. One part arises from the tuning which has been selected in order to obviate resonance effects under normal conditions that is without earth leakage. Another part arises from the fact that the compensation device, which comprises essentially a choke coil connected in a particular manner, does not operate as a pure inductance, that is it also involves resistance. A further part of the residual earth leakage current arises from the harmonics of the system voltage or of the earth leakage current. These harmonics, which have hitherto been but little considered, may under certain circumstances become so great that the result of the compensation becomes dubious.

An object of my invention is to eliminate the disadvantages set forth, that is, to provide a compensating device by which not only the fundamental of the earth leakage or unbalanced charging current, as heretofore, is compensated but also simultaneously at least one of the harmonics thereof is substantially compensated or suppressed and at least another harmonic is substantially prevented from flowing.

My invention will be better understood from the following description when considered in connection with the accompanying drawing and its scope will be pointed out in the appended claims.

Figure 1:
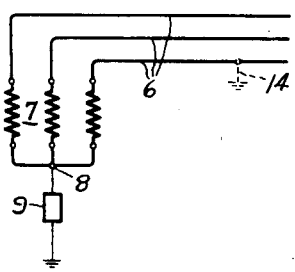
Figure 2:
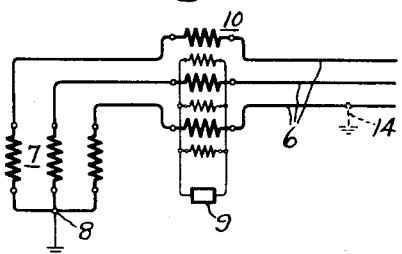
Figure 3:
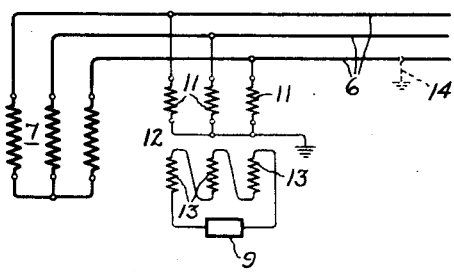
Figure 4:
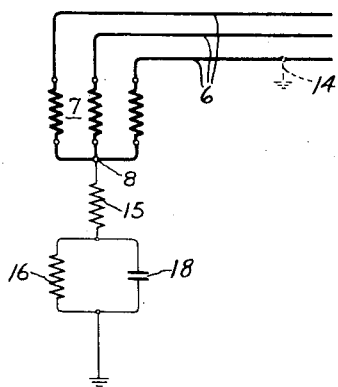
Figure 5:
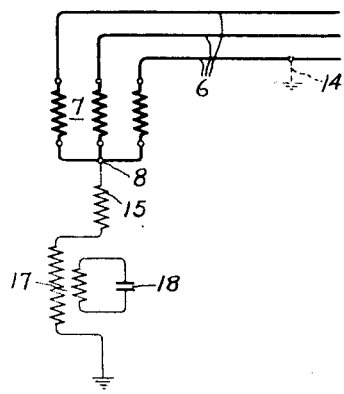

In the accompanying drawing Figs. 1, 2, and 3 illustrate diagrammatically certain known arrangements for the compensation of the earth leakage current and Figs. 4 and 5 illustrate diagrammatically embodiments of my present invention.

My invention represents a further development of the known arrangements for the compensation of the earth leakage current and can be employed with any of the known arrangements of which some examples are shown in Figs. 1, 2, and 3 for the purpose of more clearly illustrating the application of my invention. In the arrangement shown in Fig. 1, a three phase alternating current line comprising conductors 6 is fed by a source 7 such as a transformer or generator having a neutral point 8. Between the neutral point 8 and earth, there is connected a choke coil 9 which serves for the compensation or suppression of the earth leakage current. In the arrangement shown in Fig. 2, the neutral point 8 of the source 7 is earthed directly and in the line conductors 6 there is connected a series transformer 10 having a closed core. The secondary windings of the series transformer 10 are star-connected at each end and between the star or common points the choke coil 9 is connected. In the arrangement shown in Fig. 3, the neutral point of the primary windings 11 of an auxiliary grounding transformer 12 is earthed while the secondary windings 13 are connected in an open delta which is closed through the choke coil 9. In these arrangements, under normal conditions, the connection between the neutral point and earth is substantially currentless. If, however, one of the conductors 6 becomes grounded as indicated at 14, there tends to flow in this ground fault connection an earth leakage or charging current arising from the unbalanced capacitance to ground of the ungrounded conductors. This earth leakage current except for the residual current heretofore mentioned is compensated by a substantially equal and opposite in phase current which flows in the choke coil 9 and the earth connection of the neutral point 8.

According to my present invention, in all the compensating connections the simple choke coil heretofore used is replaced by an arrangement which comprises both positive and negative reactance, that is inductance such as choke coils 15 and 16 or their equivalents 17 and capacitance such as condensers 18 as shown for example in Figs. 4 and 5.

In the arrangement shown in Fig. 4, the simple choke coil 9 is replaced by the series connection of a choke coil 15 with a parallel connected group comprising a choke coil 16 and a condenser 18. By means of this arrangement with a suitable dimensioning of the reactances of the circuit including the choke coils 15, 16 and the condenser 18, a compensation for two frequencies can be obtained, that is for example the fundamental and the fifth harmonic and the third harmonic is substantially prevented from flowing.

For complete compensation the reactance of the whole arrangement for any other than the third harmonic should be inversely proportional to the frequency and for the third harmonic in order to prevent the flow thereof, infinite or sufficiently great for practical purposes since the third harmonics flow alike in all the phases. If, therefore, the arrangement shown in Fig. 4 is to serve to compensate the fundamental and the fifth harmonic and substantially prevent the flow of the third harmonic, then the reactance of the whole arrangement should be infinite for the third harmonic and for the fifth harmonic equal to one-fifth of the reactance for the fundamental. This, as is shown by calculation, is the case when the reactances of the choke coils 15 and 16 and the condenser 18 are respectively substantially 36, 57, and 512 per cent of the reactance which a simple choke coil tuned for resonance should have. Thus with the arrangement shown in Fig. 4, the earth connection 15, 16, 18 is electrically so dimensioned as to permit the flow therein of sufficient lagging current of the fundamental frequency of the system and a harmonic thereof substantially to suppress the fundamental and the corresponding harmonic of the unbalanced charging current of the system and simultaneously to prevent the flow of another harmonic of this current. Of course, if the reactance of the whole arrangement is infinite to the third harmonic, no third harmonic earth leakage current of the system can flow. These values are of course altered if, for example instead of a complete compensation of the fundamental, operation at dissonance is desired. The values are further altered if the choke coils 15, 16, even though provided with liberal air gaps, are subject to the influence of magnetic saturation.

By dispensing with the choke coil 15 of Fig. 4, the remaining parallel connection of the choke coil 16 and the condenser 18 can be suitably employed for compensating of the fundamental and preventing the flow of the third harmonic. In this case the reactances of the choke coil 16 and the condenser 18 should be respectively 89 and 800 per cent of the reactance of the simple choke coil for suppressing the fundamental.

In the arrangement shown in Fig. 5 the choke coil 16 of Fig. 4 is replaced by a transformer 17 whose primary is connected in series with the choke coil 15 and whose secondary is connected to the condenser 18. In this case the transformer 17 is designed for high no-load current and the reactance thereby necessitated takes the place of the reactance of the choke coil 16 of Fig. 4.

In the design of the choke coil 15, there must be considered the reactance of the apparatus connected in series with it, as for example the reactance of the transformer 7 for a current flowing through its neutral point. By the amount of this reactance, the reactance of the choke coil 15, as compared with the theoretical value, is to be diminished. There is also to be considered the fact that the reactance of the transformer 7 which, in contradistinction to the earth leakage coils, is generally constructed without air gaps, is for different waves not simply proportional to the frequency. If the magnitude of the transformer reactance is adequate, the choke coil 15 is unnecessary.

While I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:—

1. An alternating current electric system and an earth connection therefor comprising a circuit electrically so dimensioned as substantially to suppress the fundamental and a harmonic of the unbalanced charging current of said system.

2. Earth leakage current suppressing means for an alternating current electric system comprising a reactive circuit electrically so dimensioned as substantially to suppress the fundamental and a harmonic of the unbalanced charging current of the system and substantially to prevent the flow of another harmonic of said current.

3. Earth leakage current suppressing means for an alternating current electric system comprising a reactive circuit electrically so dimensioned as substantially to suppress the fundamental and a harmonic of the unbalanced charging current of the system, a portion of said circuit including a choke coil and a condenser connected in parallel.

4. In combination with an alternating current electric system having a grounded neutral point, an earth leakage current suppressing circuit comprising a choke coil and a condenser connected in parallel and another choke coil connected in series therewith, the inductances of said choke coils and the capacitance of said condenser being so proportioned as substantially to suppress the fundamental and a harmonic of the unbalanced charging current of the system.

5. In combination with an alternating current electric system, an earth connection comprising a choke coil and a condenser connected in parallel and another choke coil connected in series therewith, the reactances of said choke coils and condenser being so proportioned as substantially to compensate the fundamental and the fifth harmonic of the unbalanced charging current of the system and substantially to prevent the flow of the third harmonic of said current.

6. An alternating current electric system having a neutral point and a connection between the neutral point and earth electrically dimensioned to suppress the fundamental of the earth fault charging current, the reactance of said connection to an $n$th harmonic of said current being $\frac{1}{n\text{th}}$ of its reactance to said fundamental, $n$ being an odd integer other than a multiple of three.

7. An alternating current electric system having a neutral point and a connection between the neutral point and earth electrically dimensioned substantially to suppress the fundamental of the earth fault charging current, said connection having a reactance which is practically infinite to a third harmonic of said current and which to an $n$th harmonic of said current is substantially $\frac{1}{n\text{th}}$ of its reactance to said fundamental, $n$ being an odd integer other than a multiple of three.

8. An alternating current electric system and an earth connection therefor comprising a circut electrically so dimensioned as to permit the flow therein of sufficient lagging currents of the fundamental system frequency and a harmonic thereof substantially to compensate the fundamental and said harmonic of the unbalanced charging current of the system and substantially to prevent the flow of another harmonic of the leakage current to ground of the system.

In witness whereof, I have hereunto set my hand this 16th day of February, 1927.

WALDEMAR PETERSEN.